Figure 1:
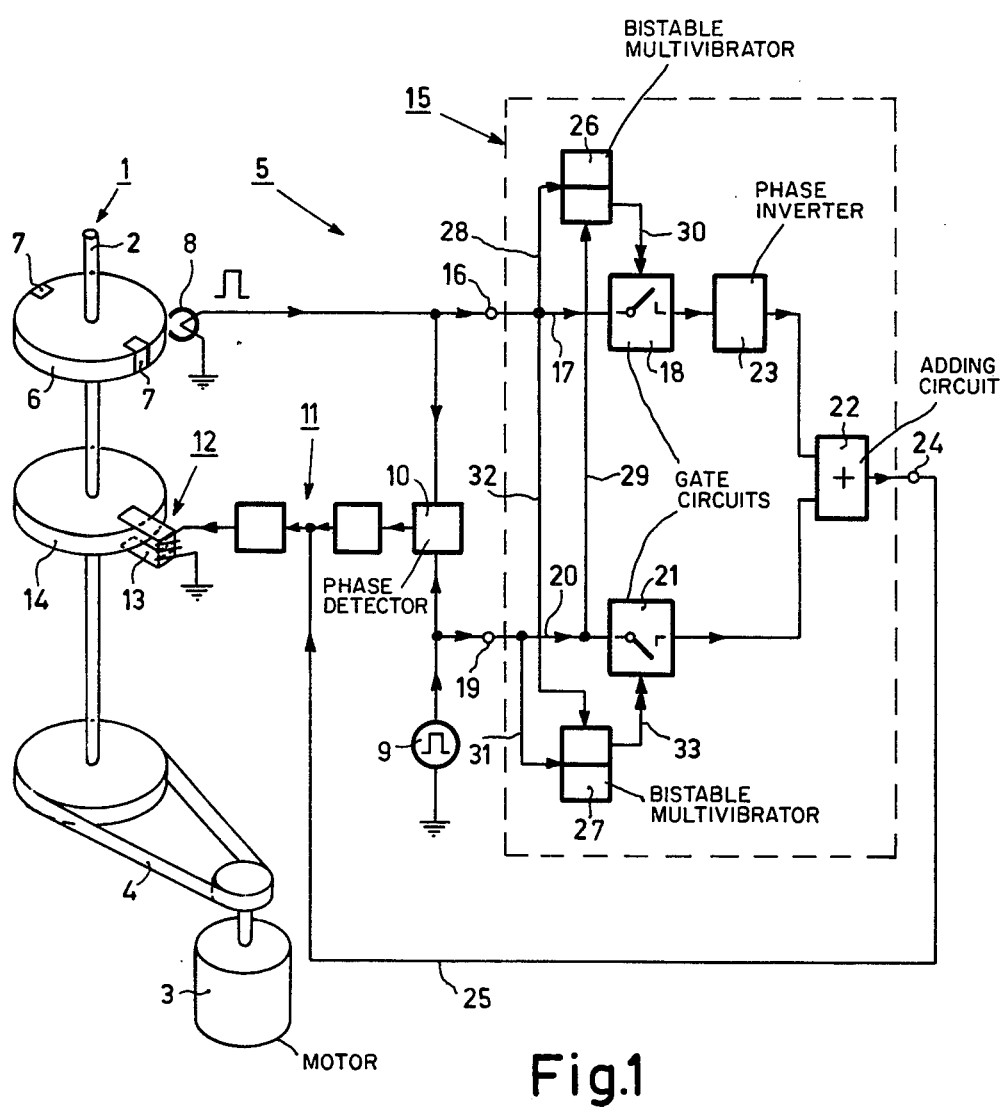

United States Patent [19]

Jahnke et al.

[11] 4,032,826
[45] June 28, 1977

[54] CIRCUIT ARRANGEMENT FOR PHASE-ALIGNMENT OF A SERVO DRIVE FOR A ROTARY SYSTEM

[75] Inventors: Uwe Jahnke; Friedrich Sommer, both of Vienna, Austria

[73] Assignee: U.S. Philips Corporation, New York, N.Y.

[22] Filed: Oct. 6, 1975

[21] Appl. No.: 619,847

[30] Foreign Application Priority Data

Oct. 16, 1974 Austria .................... 8302/74

[52] U.S. Cl. ................. 318/314; 318/317; 318/318

[51] Int. Cl.² ........................................ H02P 5/50

[58] Field of Search ............... 318/317, 314, 318

[56] References Cited

UNITED STATES PATENTS

| | | | |
|---|---|---|---|
| 3,500,160 | 3/1970 | Sommer | 318/318 X |
| 3,870,937 | 3/1975 | Ban | 318/318 X |
| 3,873,900 | 3/1975 | Sommer et al. | 318/318 |
| 3,931,556 | 1/1976 | Ban | 318/318 X |

*Primary Examiner*—B. Dobeck
*Attorney, Agent, or Firm*—Frank R. Trifari; Simon L. Cohen

[57] ABSTRACT

A circuit arrangement for phase-alignment of a servo drive for a rotary system, to whose correction element for correcting the speed of said system the output signal of a phase detector is applied via a transmission path which output signal determines the mutual phase relationship of an actual signal and of the desired signal, comprises two gate circuits of which one circuit receives the pulse-shaped actual signal and the other circuit receives the pulse-shaped desired signal as an input signal, and whose output signals are applied to the transmission path in phase opposition for phase-alignment of the rotary system, each of the gate circuits being controlled by a bistable multivibrator which can also be changed over by said actual and desired signals, so that a gate circuit is opened only when its input signal contains more than one pulse between two consecutive pulses in the input signal of the other gate circuit.

4 Claims, 3 Drawing Figures

CIRCUIT ARRANGEMENT FOR PHASE-ALIGNMENT OF A SERVO DRIVE FOR A ROTARY SYSTEM

The invention relates to a circuit arrangement for phase alignment of a servo drive for a rotary system, which drive comprises a speed control circuit including a phase detector which is controlled by an actual signal and a desired signal, of which phase detector the output signal is applied to a correction element for correcting the speed of the rotary system via a transmission path which is provided for further processing of this signal, the actual signal and the desired signal being available as pulse-shaped signals, whose respective pulses appear alternately in the desired condition of the system. To date the design of a circuit arrangement for phase-alignment of such a servo drive mainly depends on the type of phase detector used. For example, in Austrian Pat. No. 275,670 a circuit arrangement is described which employs a bistable multivibrator on which is controlled by two pulse-shaped signals as a phase detector, said bistable being preceded by means for phase-alignment of the system while Austrian Pat. No. 306,173 describes a circuit arrangement with a phase detector which compares a sawtooth signal with a pulse-shaped signal, said detector being followed by means for phase-alignment of the system. In the first-mentioned case the means for phase-alignment of the system determines the time sequence of the pulses of the actual signal and of the desired signal and when more than one pulse of the one signal appears between two pulses of the other signal influences the phase detector in a specific manner during a given time interval. In the second case the output signal of the phase detector is differentiated by the means provided for phase-alignment of the system and is added to the signal which controls the correction element in a specific manner.

It is an object of the invention to provide a circuit arrangement for phase-alignment of a servo drive for a rotary system, which may be employed independently of the embodiment of the phase detector and which ensures rapid and reliable starting of the system in the desired condition. For this, the circuit arrangement according to the invention is characterized in that two gate circuits are provided each comprising an input, an output and at least one control input, the pulse-shaped actual signal being applied to the input of the first gate circuit via a signal path, and the pulse-shaped desired signal being applied to the input of the second gate circuit via a second signal path, for phase-alignment of the rotary system the output signals of the two gate circuits are applied to the transmission path in phase opposition from an output of a bistable multivibrator, which for changing over from the one stable state to the other receives the pulse shaped actual signal at the one input and the pulse-shaped desired signal at the other input, a control signal, which is produced depending on the time sequence of the pulses of the actual signal and of the desired signal, is applied to the control input of each gate circuit, the control signal opens that gate circuit whose input signal contains more than one pulse between two consecutive pulses in the input signal of the other gate circuit. Thus, the circuit arrangement for phase-alignment of the system only operates with the pulse-shaped actual signal and the pulse-shaped desired signal and derives a signal therefrom, which may be added directly to the signal for controlling a correction element, so that there is no dependence on the mode of operation of the phase detector.

For controlling the two gate circuits a separate bistable multivibrator may be provided for each of them which, in particular if such a circuit arrangement takes the form of an integrated circuit, may be advantageous, for example with respect to an accurate and dependable mutual control of the individual circuit element. A very simple embodiment of a circuit arrangement according to the invention is obtained when for controlling the two gate circuits a bistable multivibrator is provided, of which one output controls the one gate circuit and of which the other output controls the other gate circuit. Owing to its simple design such an embodiment is particularly advantageous when the circuit arrangement consists of discrete circuit elements.

Furthermore, it has been found to be advantageous when in addition a blocking means is provided which, under control of the output of a coincidence stage which at one input receives the pulse-shaped actual signal and at the other input the pusle-shaped desired signal, in the event of the substantially simultaneous appearance of a pulse of the actual signal and a pulse of the desired signal, blocks the signal paths which include the two gate circuits, both for the pusle-shaped actual signal and for the pulse-shaped desired signal. Thus, it is avoided with certainty that a distrubance may occur in the output signal of the circuit arrangement when upon starting of the system in the desired condition it should happen that each time a pulse of the actual signal and a pulse of the desired signal appear simultaneously. In this respect it has been found to be particularly favourable in view of a very simple circuit design, when the blocking means is directly formed by the two gate circuits, the output of the coincidence stage being connected to a further control input of each of the two gate circuits.

The invention will be described in more detail with reference to the accompanying drawings, which schematically represent some embodiments thereof, although the invention is not limited thereto.

Figure 2:
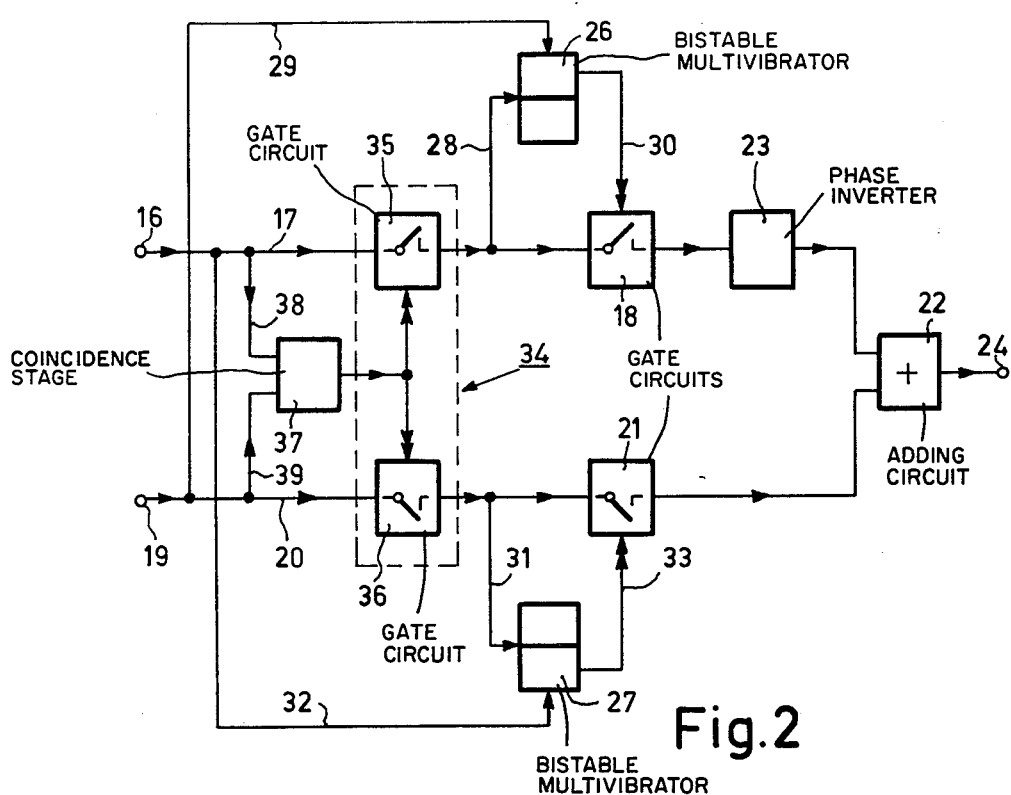
Figure 3:
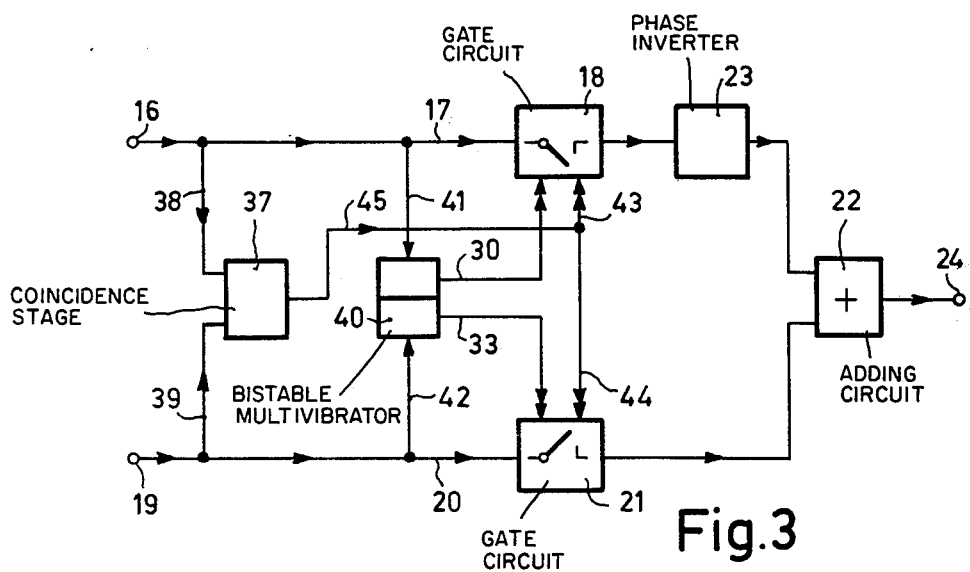

FIG. 1 shows a complete servo drive for a rotary system with a circuit arrangement according to the invention for phase-alignment thereof, each of the two gate circuits being controlled by an individual bistable multivibrator;

FIG. 2 separately shows a circuit arrangement according to the invention similar to the embodiment of FIG. 1 which moreover includes a blocking means, and FIG. 3 also shows a circuit arrangement according to the invention, which moreover includes a blocking means which in its totality is of very simple design.

In FIG. 1 the reference numeral 1 denotes a rotary system, which for example consists of a drive spindle 2 for driving a record carrier, which spindle is driven by a motor 3 via a pulley 4. In order to obtain a specific speed of the drive spindle a control circuit 5 is provided, which by comparison of an actual signal with a desired signal, which signals in the present instance are directly available as pulse-shaped signals, derives a control quantity for a correction element which influences the speed of the system. For obtaining the actual signal a disk 6 is disposed on the drive spindle 2, which along its circumference carries for example two magnets 7. When the disk rotates, the magnets 7 are moved past a magnetic head 8, so that pulses are induced therein. The frequency of this pulse train, which corresponds to the actual signal, is a measure of the actual speed of the drive spindle. The desired signal is obtained from a voltage source 9, which supplies a pulse train of constant pulse repetition frequency, for example in that pulses are derived from the line voltage. These two signals are compared directly or after suitable conversion in the phase detector 10, a signal being formed which is a measure of the mutual frequency and phase difference between the actual and the desired signal. Via a transmission path 11, which may include matching elements, filters, amplifiers etc., the output signal of the phase detector 10 is applied to a correction element 12, which consists of an eddy-current brake 13, which influences a disk 14 which is connected to the drive spindle 2. It is obvious that the correction element might also directly influence the motor 3 in known manner, for example by correspondingly controlling its power supply. Such a servo drive ensures that the rotary system is started in a desired condition which is defined by the desired signal and is further maintained in said condition.

When the system is in the desired condition, each pulse of the actual signal is followed by a pulse of the desired signal and said pulse in its turn by a pulse of the actual signal. During starting of the system in the desired condition, when the speed of the system relative to the desired speed is too low or too high, there is a difference between the frequency of the actual signal and of the desired signal, so that between two pulses of the one signal more than one pulse of the other signal appears. This situation may be utilized in known manner by influencing the control circuit, depending on the time-sequence of the pulses of the actual signal and the desired signal, in such a way that the system is started as rapidly as possible in the desired condition. Such a circuit arrangement for phase-alignment of the servo drive for the rotary system 1 is denoted by 15 in FIG. 1 and is described hereinafter.

From a connection 17, at which the pulse-shaped actual signal is available, a connection 17 leads to the input of a first gate circuit 18, and from a connection 19, at which the pulse-shaped desired signal is available, a second connection 20 leads to the input of a second gate circuit 21. The output signals of the two gate circuits 18 and 21 are applied to an adding circuit 22. A phase-inverter 23 is included between the adding circuit and for example the gate circuit 18, so that the two output signals are added in phase opposition, obviously, phase inversion of one of the two signals might also be effected directly in the adding circuit. The output 24 of the adding circuit 22 is connected to the transmission path 11 via a line 25. For controlling the two gate circuits 18 and 21 bistable multivibrators 26 and 27 respectively are provided. The actual signal is applied to the clock input of the bistable multivibrator 26 via a line 28 and a desired signal is applied to the set input thereof via a line 29. From an output of the multivibrator 26 a control signal reaches a control input of the gate circuit 18 via a line 30. Via a line 31 the desired signal is applied to the clock input of the other bistable multivibrator 27 and via a line 32 the actual signal is applied to the set input. From an output of said bistable multivibrator 27 a control signal is fed to a control input of the gate circuit 21 via a line 33.

When the rotary system is in its desired condition, a pulse of the actual signal, as previously stated, is followed by a pulse of the desired signal and subsequently another pulse of the actual signal appears. In this case the two bistable multivibrators 26 and 27 are alternately changed over by pulses of the actual signal and of the desired signal, a signal appearing at the outputs thereof which blocks the two gate circuits 18 and 21 for the signals applied to the inputs thereof. As a result, both the pulses of the actual signal and those of the desired signal cannot pass through the gate circuits 18 and 21 and no signal appears. At the output 24 of the adding circuit 22, so that the transmission path 11 neither receives an additional signal. Consequently the circuit 15 has no effect on the control circuit 5 in the desired condition of the system.

When the rotary system is in the starting condition, assuming that for the time being the speed is below the desired speed, more than one pulse of the desired signal will appear between two pulses of the actual signal. When a pulse of the actual signal is followed by the first pulse of the desired signal, the bistable multivibrator 27 is changed over and remains in this state until the next pulse of the actual signal appears. The control signal which is then supplied via the line 33 to the gate circuit 21 which is included in the signal path 20 for the desired signal, then opens said gate circuit until upon the appearance of the next pulse of the actual signal it is blocked again. However, as a result of this, all pulses following the first pulse of the desired signal can pass the gate circuit 21 until the next pulse of the actual signal appears. Via the output 24 of the adding circuit 22 and the line 25 these pulses now reach the transmission path 11 of the control circuit, said pulses being superimposed on the instantaneous control signal of the control circuit, with such a polarity as to cause the system to approximate the desired condition more closely. The other gate circuit 18, which is included in the signal path 17 for the actual signal, remains blocked for this signal, because a pulse of the actual signal appears between every two pulses of the desired signal and consequently the bistable multivibrator 26 which controls said gate circuit supplies a control signal having a similar variation as in the desired condition of the system. In the present instance the pulses of the actual signal therefore have no effect, but only those pulses of the desired signal which are still present in addition to the pulse which occurs between two pulses of the actual signal in the desired condition.

When the rotary system is in the starting condition and its speed is higher than the desired speed, more than one pulse of the actual signal will appear between two pulses of the desired signal. In this case the gate circuit 18, which is included in the signal path 17 for the actual signal and which is controlled by the bistable multivibrator 26, is opened for those pulses of the actual signal which in the desired condition appears in addition to the one pulse between two pulses of the desired signal. Via the output 24 of the adding circuit 22 and the line 25 these pulses now reach the transmission path 11 of the control circuit 5 in phase opposition as an additional signal and thus again ensure that the system approximate to the desired condition. The gate circuit 21 then remains blocked for pulses of the desired signal.

In this way, as is evident, a signal is derived from the pulse-shaped actual signal and the pulse-shaped desired signal, which merely promotes the phase-alignment of the rotary system, so that this process is performed rapidly and reliably. The steps described may be employed independently of the design of the actual control circuit and, in particular of that of the phase detector, so that such a circuit arrangement is suitable for universal use. When the actual signal and the desired signal are not directly available as pulse-shaped signal, such pulse-shaped signals may be formed by the use of suitable signal conversion stages.

During starting the system in the desired condition it may happen that a pulse of the actual signal and a pulse of the desired signal appear simultaneously. With the circuit arrangement described hereinbefore it is then possible, depending on the circuit technique employed, to obtain two different modes of operation for the gate circuits 18 and 21 and the bistable multivibrators 26 and 27 which control said gate circuits depending on whether the leading edges or the trailing edges of the pulses are employed for initiating switching processes; this is because the two gate circuits 18 and 21 may either be opened or closed. When the two gate circuits are opened upon the simultaneous occurrence of a pulse of the actual signal and a pulse of the desired signal, the pulse transferred by the gate circuits cancel each other in the adding circuit, because they are applied thereto in phase opposition, whereas in the case of gate circuits which are closed, the pulses cannot pass through said circuit. Thus no additional signal is applied to the transmission path 11, when a pulse of the actual signal and a pulse of the desired signal appear simultaneously, which is of importance because at such instant there is no criterion to determine whether the frequency of the actual signal is higher or lower than that of the desired signal. It has been found that the choice of the last-mentioned modification of the circuit arrangement, i.e. closure of the two gate circuits 18 and 21, is more favourable, because if the two pulses do not appear exactly simultaneously, it is then assured that no disturbing signal can be formed at output 24 of the adding circuit 22.

If in this respect even greater certainty is required that no disturbance can occur in the event of the substantially simultaneous appearance of a pulse of the actual signal and a pulse of the desired signal, it has been found to be advantageous when in addition a blocking means is included, as shown in the circuit arrangement of FIG. 2. The blocking means 34 is then formed by two further gate circuits 35 and 36, of which the gate circuit 35 is included in the signal path 17 for the actual signal and the gate circuit 36 in the signal path 20 for the desired signal. The two gate circuits 35 and 36 precede the gate circuits 18 and 21 with respect to the signal paths 17 and 20. However, they might also be included after these last-mentioned circuits. The gate circuits 35 and 36 are jointly controlled by the output of a coincidence stage 37, to an output of which the actual signal is applied via a line 38. In the case that a pulse of the actual signal and a pulse of the desired signal do not occur substantially simultaneously, the coincidence circuit 37 supplies such a control signal to the gate circuits 35 and 36, that these circuits are opened, so that the pulses of the two signals reach the gate circuits 18 and 21 and the bistable multivibrators 26 and 27. When a pulse of the actual signal and a pulse of the desired signal appear substantially simultaneously, the coincidence stage 37 produces a control signal which blocks the gate circuits 35 and 36, so that the signal paths 17 and 20 are interrupted both for the actual signal and for the desired signal.

For controlling the bistable multivibrator 26, it is effective to connect the line 29 via which the desired signal is applied to the set input, to the signal path 20 for the desired signal before the gate circuit 36 and to connect the line 28, via which the actual signal is applied to the clock input, to the signal path 17 for the actual signal behind the gate circuit 35, and similarly to the control of the bistable multivibrator 27, to connect the line 32 via which the actual signal is applied to the set input to the signal path before the gate circuit 35, and to connect the line 31, via which the desired signal is applied to the clock input, to the signal path 20 behind the gate circuit 36. This ensures that the two bistable multivibrators 26 and 27 are always maintained in a defined switching state.

In the circuit arrangement for controlling the two gate circuits 18 and 21 shown in FIG. 3 a single bistable multivibrator 40 is included, to whose set input the actual signal is applied via a line 41 which is connected to the signal path 17 and to whose reset input the desired signal is applied via a line 42 which is connected to the signal path 20. The one output of the bistable multivibrator 40 is connected to the control input of the gate circuit 18 via the line 30 and the other output is connected to the control input of the other gate circuit 21 via the line 33. The operation of this circuit arrangement is similar to that of the circuit arrangement of FIG. 1. In that case pulses are obtained at the output 24 of the adding circuit 22 when the frequency of the actual signal deviates from that of the desired signal, namely either pulses of the actual signal or pulses of the desired signal, depending on the nature of the frequency deviation. The number of pulses depends on how many pulses of the one signal appear in excess of the pulse which appears between two pulses of the other signal in the desired condition.

The two gate circuits 18 and 21 are then directly employed as blocking means. For this purpose a further control input of each of the gate circuits 18 and 21 is connected to the output of the coincidence stage 37 via a line 43 and 44 respectively, which terminate in a common line 45 which is connected to the output of said coincidence stage 37. Via a line 38 the actual signal is applied to the one input of the coincidence stage 37 and via a line 39 the desired signal is applied to the other input. The operation of said blocking means is similar to that of the blocking means of FIG. 2. As soon as a pulse of the actual signal and a pulse of the desired signal appear substantially simultaneously, the two gate circuits 18 and 21 are blocked by the output of the coincidence stage 37, so that none of the pulses can reach the adding circuit 22. It is obvious that in a conventional manner such pulse delays must be provided as to ensure a correct timing of the switching processes, which also applies to the embodiments of FIGS. 1 and 2.

It is evident that within the scope of the invention a multitude of modifications to the embodiments described hereinbefore are possible. This applies in particular to the choice of the types of gate circuits and bistable multivibrator used, for which all those types may be employed which are known from digital processing techniques, namely for example depending on whether positive or negative logic is employed and the choice of the input and output level of controlling the signals is used.

What is claimed is:

1. Circuit arrangement for phase-alignment of a servo drive for a rotary system, of the type wherein a speed control circuit including a phase detector which is controlled by an actual signal and a desired signal of which phase detector the output signal is applied to a correction element for correcting the speed of the rotary system via a transmission path which is provided for further processing of this signal, the actual signal and the desired signal being available as pulse-shaped signals, whose respective pulses appear alternately in the desired condition of the system, the improvement comprising two gate circuits each comprising an input, an an output and at least one control input, a first signal path, a second signal path, the pulse-shaped actual signal being applied to the input of the first gate circuit via said first signal path, and the pulse-shaped desired signal being applied to the input of the second gate circuit via said second signal path, means for applying each pulse of the output signals from said first and second gate circuits to the transmission path in phase opposition, and a bistable multivibrator having a first input connected to the pulse-shaped actual signal and having a second input connected to the pulse-shaped desired signal, said bistable multivibrator providing a control signal depending on the timesequence of the pulses of the actual signal and of the desired signal, and means for applying said control signal to the control input of each gate circuit, whereby said control signal opens that gate circuit whose input signal contains more than one pulse between two consecutive pulses in the input signal of the other gate circuit.

2. A circuit arrangement as claimed in claim 1, wherein said control signal from said bistable multivibrator is provided on two complimentary output terminals, one output terminal being connected to the first gate circuit and the other output terminal being connected to the second gate circuit.

3. A circuit arrangement as claimed in claim 1, further comprising a coincidence gate having one input connected to the pulse-shaped actual signal and a second input connected to the pulse-shaped desired signal, and blocking means connected to the output of said coincidence gate and responsive to the substantially simultaneous appearance of a pulse of the actual signal and a pulse of the desired signal for blocking the signal paths which include the two gate circuits, both for the pulse-shaped actual signal and for the pulse shaped desired signal.

4. A circuit arrangment as claimed in claim 3, wherein the blocking means is directly formed by the two gate circuits, the output of the coincidence gate being connected to a further control input of each of the two gate circuits.

* * * * *